Jan. 8, 1963　　　C. D. HOBSON　　　3,072,450
HYDRAULIC PISTON CUP
Filed Jan. 12, 1959
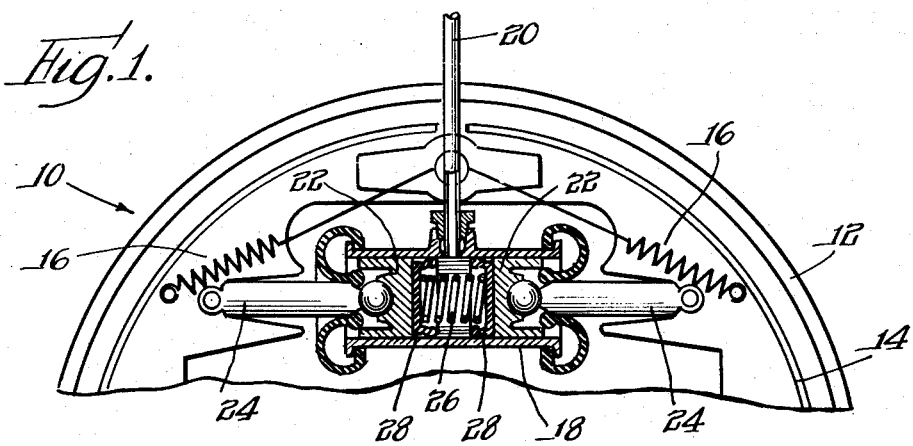
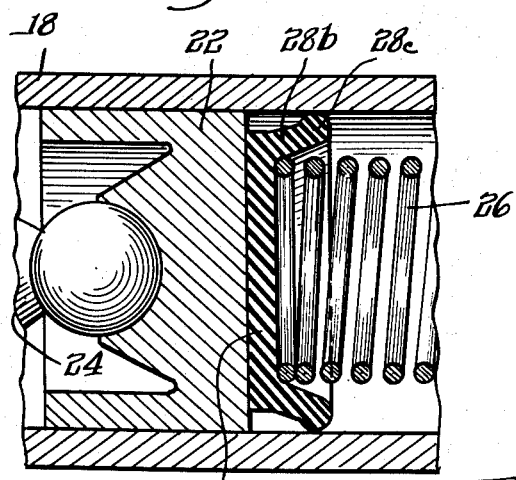
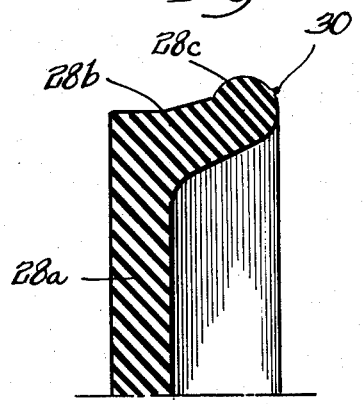
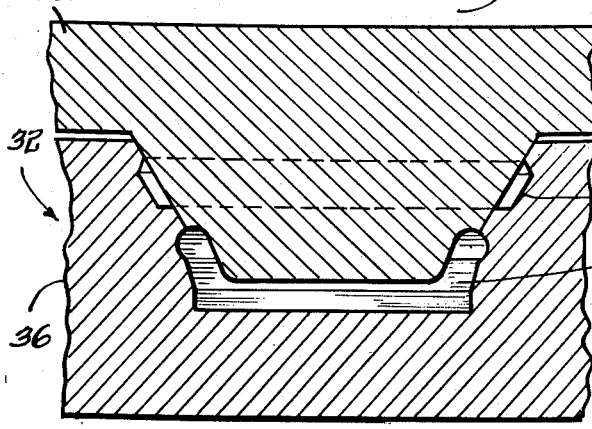
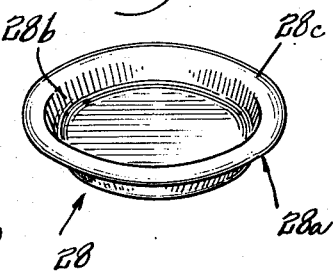
INVENTOR.
Carroll D. Hobson
BY Olson & Trexler
Attys.

United States Patent Office 3,072,450
Patented Jan. 8, 1963

3,072,450
HYDRAULIC PISTON CUP
Carroll D. Hobson, Goshen, Ind., assignor to Goshen Rubber Co., Inc., Goshen, Ind., a corporation of Indiana
Filed Jan. 12, 1959, Ser. No. 786,229
2 Claims. (Cl. 309—53)

This invention relates generally to hydraulic piston cups and more particularly to piston cups for use in the hydraulic brakes of automobiles.

Heretofore, hydraulic piston cups have been provided with a sharp feather-edge which prevents hydraulic fluid from escaping between the piston and its cylinder. According to conventional practice, this feather-edge is formed by grinding or machining the previously molded piston cup. The resulting structure has proved difficult to insert into the hydraulic cylinder; and more importantly, any inaccuracies in the grinding or machining operation result in cuts or serrations along the feather-edge, which cuts or serrations are permissive of fluid leakage. Furthermore, these prior art piston cups can be predisposed to failure by rough handling, nicks or other like damage to the feather-edge making the cups susceptible to leakage.

Therefore, a general object of the present invention is to provide an improved hydraulic piston cup.

Another object of the present invention is to provide a molded hydraulic piston cup which requires no grinding or machining of the sealing surface.

Yet another object of the invention is to provide a hydraulic piston cup having increased contact area at the sealing surface.

A further object of the invention is to provide a hydraulic piston cup which is easier to assemble and which has a longer use-life.

A still further object of the present invention is to provide a hydraulic piston cup which is resistant to failure resulting from nicking the sealing surface.

Additional objects and features of the invention pertain to the particular structure and arrangements whereby the above objects are attained.

The structure in accordance with the invention includes a piston cup having a disc portion, a first annular portion of substantial circular cross section, and a second annular portion flexibly connecting the disc portion and the first annular portion.

The invention, both to its structure and mode of operation, will be better understood by reference to the following disclosure and drawings forming a part thereof, wherein:

FIG. 1 is a schematic view in partial section of an automotive brake assembly incorporating hydraulic piston cups in accordance with the present invention;

FIG. 2 is an enlarged, fragmentary view showing the piston and the piston cup;

FIG. 3 is a fragmentary view in section of a piston cup in accordance with the invention illustrating the flash incurred during molding;

FIG. 4 is a sectional view of the molding apparatus for producing piston cups in accordance with the present invention; and FIG. 5 is a perspective view of the piston cup of the invention.

Referring now in detail to the drawings and specifically to FIG. 1, there is generally shown an automotive wheel brake assembly 10 including a brake drum 12, a brake shoe 14, brake shoe return springs 16, a wheel cylinder 18 and a hydraulic line 20 communicating with the master cylinder of the hydraulic brake system. Since these elements comprise no part of the present invention, they will not be described in detail.

In further accord with conventional practice, wheel cylinder 18 encloses the hydraulic pistons 22 which are connected to the linkages 24, piston return spring 26 providing proper bias to the pistons 22. In order to seal off the hydraulic chamber defined between the pistons 22, piston cups 28 are disposed between return spring 26 and the pistons 22.

As is better shown in FIGS. 2 and 5, hydraulic piston cup 28 is comprised of a plate or disc portion 28a which closes off one end of the throat portion 28b. The open end of throat portion 28b terminates in a rounded, or more specifically a toroidal sealing portion 28c. Plate 28a is preferably rigid while the throat portion 28b and the sealing portion 28c are desirably somewhat flexible in order that the portion 28c may elongate to its own longitudinal axis or dilate into uniform and intimate contact with the internal surface of cylinder 18. The desirable characteristics of the several portions of cup 28 have advantageously been obtained by molding the cup 28 from a suitable rubber compound.

According to an important feature of the invention, the sealing portion 28c displays a substantially circular cross section. This contour plus the requisite ability to deform under mild pressure enables the piston cup of the present invention to provide a relatively large sealing surface in contact with the cylinder 18. This combination of attributes also tends to minimize any leakage difficulties which might arise due to small cuts or imperfections in the outer surface of the sealing portion 28c.

Although sealing portion 28c is inherently capable of compensating for small imperfections, it is advantageous to manufacture cup 28 so as to eliminate, insofar as possible, any hazards to its successful functioning. For example, when the piston cup of the invention is molded, the molding dies are desirably arranged to dispose the flash away from the primary sealing surface of sealing portion 28c. FIG. 3 shows flash 30 located in such an unobtrusive location.

One embodiment of mold apparatus suitable for producing piston cups having suitably disposed flash is shown in FIG. 4. The compression mold apparatus shown generally at 32 includes a plunger 34 which cooperates with a base 36 in defining a mold cavity 38. As shown, plunger 34 and base 36 have tapering sides which facilitate disposition of the mold parting lines at unobtrusive locations on the molded article. Advantageously, base 36 may be provided with a flash groove 40.

According to conventional modes, depressing the brake pedal forces fluid out of the master cylinder. This fluid flows through the hydraulic line 20 to the wheel cylinder 18 forcing the pistons 22 outwardly and expanding the shoes 14 against drum 12 in order to affect braking. Releasing the brake pedal affects a return of fluid from the wheel cylinder 18 to the master cylinder. The brake shoe return springs 16 force the wheel cylinder pistons 22 to return to the release position, thereby forcing fluid out of the wheel cylinder. The check valve of the master cylinder closes when the pressure in line 20 is reduced to a small positive value. This minimum positive pressure acts against the throat portion 28b and the sealing portion 28c to dilate the portion 28c against the wheel cylinder 18. Thus, cup 28 is prevented from leaking hydraulic fluid and the hydraulic system is sealed against the possibility of air entering therein. Of course, when the brakes are being applied, the additional pressure in the system encourages cup 28 to form an even tighter seal.

Although the art of automotive wheel brake assemblies has been used for purposes of explanation and illustration, it should be noted that the construction of the piston cup of the invention is useful for master cylinder piston cups and other hydraulic piston cups as well.

It will be understood, therefore, that the invention is not limited to the particular embodiment described since many modifications may be made. Consequently, it is contemplated to cover by the appended claims any such modifications as fall within the true spirit and scope of the invention.

The invention is claimed as follows:

1. A piston cup of elastomeric material adapted to form a fluid seal in a cylindrical bore, said cup comprising: a disk portion adapted to abut a piston operative in said bore and having a diameter which is smaller than the diameter of said bore whereby said disk portion is spaced apart from the walls thereof; a resiliently deformable, toroidal sealing portion spaced apart from said disk portion in a direction away from said piston, said sealing portion having an outside diameter normally approximating the diameter of said bore; and a flexible, annular throat portion spaced apart from the walls of said bore and disposed between said disk portion and said sealing portion in integrally interconnecting relationship therewith, said throat portion and said sealing portion cooperating with said disk portion in defining a cavity for receiving and retaining fluid, said throat portion flexibly connecting said sealing portion to said disk portion and having a substantial extent between said sealing portion and said disk portion for enabling said sealing portion to respond to the pressure of said fluid by elongating relative to its own longitudinal axis whereby aggressively and deformably to engage the walls of said bore to seal said fluid from escape into the region of said piston.

2. A piston cup according to claim 1 wherein said sealing portion confronts the walls of said bore with a molded surface and wherein said sealing portion exhibits flash extending outwardly therefrom in a position generally oppositely from said annular throat portion and out of contactable relationship with the walls of said bore.

References Cited in the file of this patent

UNITED STATES PATENTS

| | | |
|---|---|---|
| 2,036,038 | Gottlieb | Mar. 31, 1936 |
| 2,321,340 | Waterbury | June 8, 1943 |
| 2,336,578 | Skoning | Dec. 14, 1943 |
| 2,383,959 | Dick | Sept. 4, 1945 |
| 2,424,225 | Dick | July 22, 1947 |
| 2,709,118 | Martin | May 24, 1955 |
| 2,815,995 | Young | Dec. 10, 1957 |
| 2,941,854 | Jernander | June 21, 1960 |